US009764717B2

(12) United States Patent
Yasutomi et al.

(10) Patent No.: US 9,764,717 B2
(45) Date of Patent: Sep. 19, 2017

(54) SLOPE-DESCENDING SPEED CONTROL DEVICE FOR A VEHICLE (71) Applicant: TOYOTA JIDOSHA KABUSHIKI KAISHA, Toyota-shi, Aichi (JP)

(72) Inventors: Taisuke Yasutomi, Ebina (JP); Takemi Murayama, Mishima (JP); Hideki Kato, Machida (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 22 days.

(21) Appl. No.: 14/917,049

(22) PCT Filed: Sep. 25, 2014

(86) PCT No.: PCT/JP2014/076337
§ 371 (c)(1),
(2) Date: Mar. 7, 2016

(87) PCT Pub. No.: WO2015/046620
PCT Pub. Date: Apr. 2, 2015

(65) Prior Publication Data
US 2016/0200297 A1 Jul. 14, 2016

(30) Foreign Application Priority Data

Sep. 27, 2013 (JP) ................. 2013-201445

(51) Int. Cl.
*B60T 7/12* (2006.01)
*B60T 8/24* (2006.01)
(52) U.S. Cl.
CPC ............... *B60T 7/12* (2013.01); *B60T 8/245* (2013.01); *B60T 2201/04* (2013.01)

(58) Field of Classification Search
CPC ....... B60T 7/12; B60T 8/245; B60T 2201/104
See application file for complete search history.

(56) References Cited

U.S. PATENT DOCUMENTS 5,269,391 A * 12/1993 Ito ..................... B60K 28/16
180/197
5,758,306 A * 5/1998 Nakamura ........... B60K 31/047
180/170

(Continued)

FOREIGN PATENT DOCUMENTS

JP 2004-142687 A 5/2004
JP 2007-253840 A 10/2007

*Primary Examiner* — Mary Cheung
(74) *Attorney, Agent, or Firm* — Sughrue Mion, PLLC (57) ABSTRACT A slope-descending speed control device 10 for a vehicle configured to control a vehicle deceleration so that an actual vehicle speed conforms to a target vehicle speed in accordance with a target deceleration Gxbt of a PID feedback control executed in accordance with a difference between a target vehicle speed Vxt and an actual vehicle speed Vx. In a situation where an actual vehicle speed is higher than a target vehicle speed, with a component in a hill-descending direction of gravitational acceleration of the vehicle at a time point when a condition for starting a slope-descending speed control is satisfied being a reference gravitational acceleration Gxd0, when a difference between a component Gxd in a hill-descending direction of gravitational acceleration and the reference gravitational acceleration Gxd0 is between upper and lower reference values, a target deceleration Gxbti of the integral term is not integrated to restrain its increase.

6 Claims, 6 Drawing Sheets (56) References Cited

U.S. PATENT DOCUMENTS

| | | |
|---|---|---|
| 7,134,985 B2 | 11/2006 | Watanabe et al. |
| 2005/0245351 A1* | 11/2005 | Yamada ................ B60W 10/06 477/110 |
| 2006/0190158 A1* | 8/2006 | Shiiba ................ B60K 31/0066 701/70 |
| 2015/0232092 A1* | 8/2015 | Fairgrieve ........... B60W 30/143 701/93 |

* cited by examiner

SLOPE-DESCENDING SPEED CONTROL DEVICE FOR A VEHICLE

CROSS REFERENCE TO RELATED APPLICATIONS

This application is a National Stage of International Application No. PCT/JP2014/076337 filed Sep. 25, 2014, claiming priority based on Japanese Patent Application No. 2013-201445 filed Sep. 27, 2013, the contents of all of which are incorporated herein by reference in their entirety.

TECHNICAL FIELD

The present invention relates to a vehicle speed control device and, more particularly, to a slope-descending speed control device for a vehicle which controls a vehicle speed during downhill traveling so as not to become excessive.

BACKGROUND ART

A slope-descending speed control device has been well known, which controls braking forces to control a deceleration of a vehicle during downhill traveling so that an actual vehicle speed conforms to a target vehicle speed by a PID feedback control executed in accordance with a difference between the target vehicle speed and the actual vehicle speed. For example, in the under-mentioned patent citation 1, a slope-descending speed control device is disclosed which is configured to modify the gains in a PID feedback control in accordance with a loading burden of a vehicle.

CITATION LIST

Background Art

Patent Literature

[PTL 1]
   Japanese Patent Laid-Open Publication No. 2004-142687

SUMMARY OF INVENTION

Technical Problem

When a slope-descending speed of a vehicle during downhill traveling is controlled by a PID feedback control executed in accordance with a difference between a target vehicle speed and an actual vehicle speed, a control amount of the integral term in a PID feedback control may become large due to a change in an inclination angle of a slope or a friction coefficient of a road surface. If a control amount of the integral term in a PID feedback control has once increased, it does not decrease quickly, even though an inclination angle of a slope or a friction coefficient of a road surface has returned to its original value. On that account, a deceleration of a vehicle increases excessively such that a vehicle speed decreases excessively, resulting in that it takes a time for a vehicle speed to go up to a target vehicle speed.

If an integral gain of the integral term in a PID feedback control is set to a small value so as to alleviate the above-mentioned defect, a control amount of the integral term during downhill traveling becomes insufficient, which makes it impossible to effectively control an actual vehicle speed to a target vehicle speed.

The above-mentioned defect arises as well when a deceleration of a vehicle is controlled in accordance with both a target deceleration on the basis of a component in a hill-descending direction of gravitational acceleration of a vehicle at a time when a control starting condition is satisfied and a target deceleration of a PID feedback control executed in accordance with a difference between a target vehicle speed and an actual vehicle speed.

In view of the above-mentioned defects in a conventional slope-descending speed control device which controls a slope-descending speed of a vehicle by a PID feedback control executed in accordance with a difference between a target vehicle speed and an actual vehicle speed, a primary object of the present invention is to prevent a control amount of the integral term in a PID feedback control from increasing excessively even when a change in an inclination angle of a slope or a friction coefficient of a road surface occurs after the control was started and thereby prevent a situation from occurring where a vehicle speed excessively decreases and it takes a long time for a vehicle speed to go up to a target vehicle speed.

Solution to Problem

Advantageous Effects of Invention

The present invention provides a slope-descending speed control device for a vehicle having a control unit which is configured to control a deceleration of a vehicle, when a predetermined condition for starting a slope-descending speed control is satisfied, so that an actual vehicle speed conforms to a target vehicle speed in accordance with at least a target deceleration of an integral term of a PID feedback control executed in accordance with a difference between a target vehicle speed and an actual vehicle speed, wherein the control unit calculates a component in a hill-descending direction of gravitational acceleration of the vehicle when an actual vehicle speed is higher than a target vehicle speed, with a reference value for determining a magnitude of a component in a hill-descending direction of gravitational acceleration of the vehicle being referred to a determination reference value, the control unit suppresses the increase of a target deceleration of the integral term in accordance with the magnitude of a difference between a component in a hill-descending direction of gravitational acceleration of the vehicle and the determination reference value.

According to the above-described configuration, a target deceleration of the integral term is restrained from increasing in accordance with the magnitude of a difference between a component in a hill-descending direction of gravitational acceleration of a vehicle and the determination reference value. Accordingly, a control amount of the integral term in a PID feedback control can be prevented from increasing excessively even when a change in inclination angle of a slope or friction coefficient of a road surface occurs after the control was started. Therefore, a situation can be prevented from occurring where a vehicle speed excessively decreases and it takes a long time for a vehicle speed to go up to a target vehicle speed.

It is to be noted that since I term of a target deceleration is allowed to increase when an inclination angle of a road, a frictional coefficient of a road surface or the like changes and the change amount from that at the time of starting the control is large, it is possible to increase a deceleration of a vehicle to effectively control an actual vehicle speed to a target vehicle speed.

According to the present invention, the above-mentioned configuration may be such that: the control unit calculates upper and lower reference values for preventing a target deceleration of the integral term from being integrated and when a component in a hill-descending direction of gravitational acceleration of the vehicle is between the upper and lower reference values, the control unit does not integrate a target deceleration of the integral term.

According to this configuration, a target deceleration of the vehicle is calculated on the basis of a target deceleration based on the reference gravitational acceleration and at least a target deceleration of the integral term. Consequently, a target deceleration of the vehicle can be calculated so that it includes a control amount corresponding to a component in a hill-descending direction of gravitational acceleration of the vehicle from the beginning of the vehicle deceleration control for a slope-descending speed control. Therefore, it is possible to control a vehicle deceleration so that an actual vehicle speed conforms to a target vehicle speed more rapidly as compared to where a target deceleration of the vehicle does not include a target deceleration based on the reference gravitational acceleration.

According to the present invention, the above-mentioned configuration may be such that: the control unit calculates upper and lower reference values for preventing a target deceleration of the integral term from being integrated on the basis of the determination reference value, and when a component in a hill-descending direction of gravitational acceleration of the vehicle is between the upper and lower reference values, the control unit does not integrate a target deceleration of the integral term.

According to this configuration, when a component in a hill-descending direction of gravitational acceleration of the vehicle is between the upper and lower reference values, a target deceleration of the integral term is not integrated. Consequently, as compared to where a target deceleration of the integral term is integrated regardless of whether or not a component in a hill-descending direction of gravitational acceleration of the vehicle is between the upper and lower reference values, I term of a target deceleration can effectively be prevented from excessively increasing.

The upper and lower reference values for preventing I term of a target deceleration from being integrated are calculated on the basis of the determination reference value which is a reference value for determining the magnitude of a component in a hill-descending direction of gravitational acceleration of a vehicle. Accordingly, a range of a component in a hill-descending direction of gravitational acceleration where I term of a target deceleration is not integrated can be set on the basis of the determination reference value.

According to the present invention, the above-mentioned configuration may be such that: as a difference between a component in a hill-descending direction of gravitational acceleration of the vehicle and the determination reference value is smaller in magnitude, the control unit decreases the magnitude of a gain for integrating a target deceleration of the integral term.

According to this configuration, as a difference between a component in a hill-descending direction of gravitational acceleration of the vehicle and the determination reference value is smaller in magnitude, the magnitude of a gain for integrating a target deceleration of the integral term is decreased. Consequently, when a difference between a component in a hill-descending direction of gravitational acceleration of the vehicle and the determination reference value is smaller in magnitude, it is possible to restrain I term of a target deceleration from increasing by integration and to prevent I term of a target deceleration from excessively increasing. In contrast, when a difference between a component in a hill-descending direction of gravitational acceleration of the vehicle and the determination reference value is larger in magnitude, it is possible to integrate I term of a target deceleration to make it increase and to effectively control a deceleration of the vehicle so that an actual vehicle speed conforms to a target vehicle speed.

According to the present invention, the above-mentioned configuration may be such that: the determination reference value is set on the basis of the reference gravitational acceleration.

According to this configuration, since the determination reference value is set on the basis of the reference gravitational acceleration, a target deceleration of the integral term can be restrained from increasing on the basis of a component in a hill-descending direction of gravitational acceleration of the vehicle at the time when a condition for starting the slope-descending speed control is satisfied.

According to the present invention, the above-mentioned configuration may be such that: the control unit calculates upper and lower guard values for limiting in magnitude a target deceleration of the integral term on the basis of the reference gravitational acceleration, and conducts a guard process on a target deceleration of the integral term with the upper and lower guard values.

According to this configuration, a guard process is conducted on a target deceleration of the integral term with the upper and lower guard values, which enables to effectively prevent a target deceleration of the integral term from excessively increasing and, accordingly, to effectively prevent a vehicle speed from excessively decreasing.

The upper and lower guard values for limiting in magnitude a target deceleration of the integral term are calculated on the basis of the reference gravitational acceleration. Accordingly, a range for preventing the magnitude of a target deceleration of the integral term from excessively increasing can be set on the basis of the reference gravitational acceleration.

It is to be noted that "a component in a hill-descending direction" means a component in a hill-descending direction along a road.

Consequently, with a gravitational acceleration of a vehicle being represented by g and an inclination angle of a road being represented by $\theta$, "a component in a hill-descending direction of vehicle" is $g*\sin\theta$.

DESCRIPTION OF EMBODIMENTS

Some preferred embodiments of the present invention will be described in detail with reference to the accompanying drawings.

First Embodiment

Figure 1:
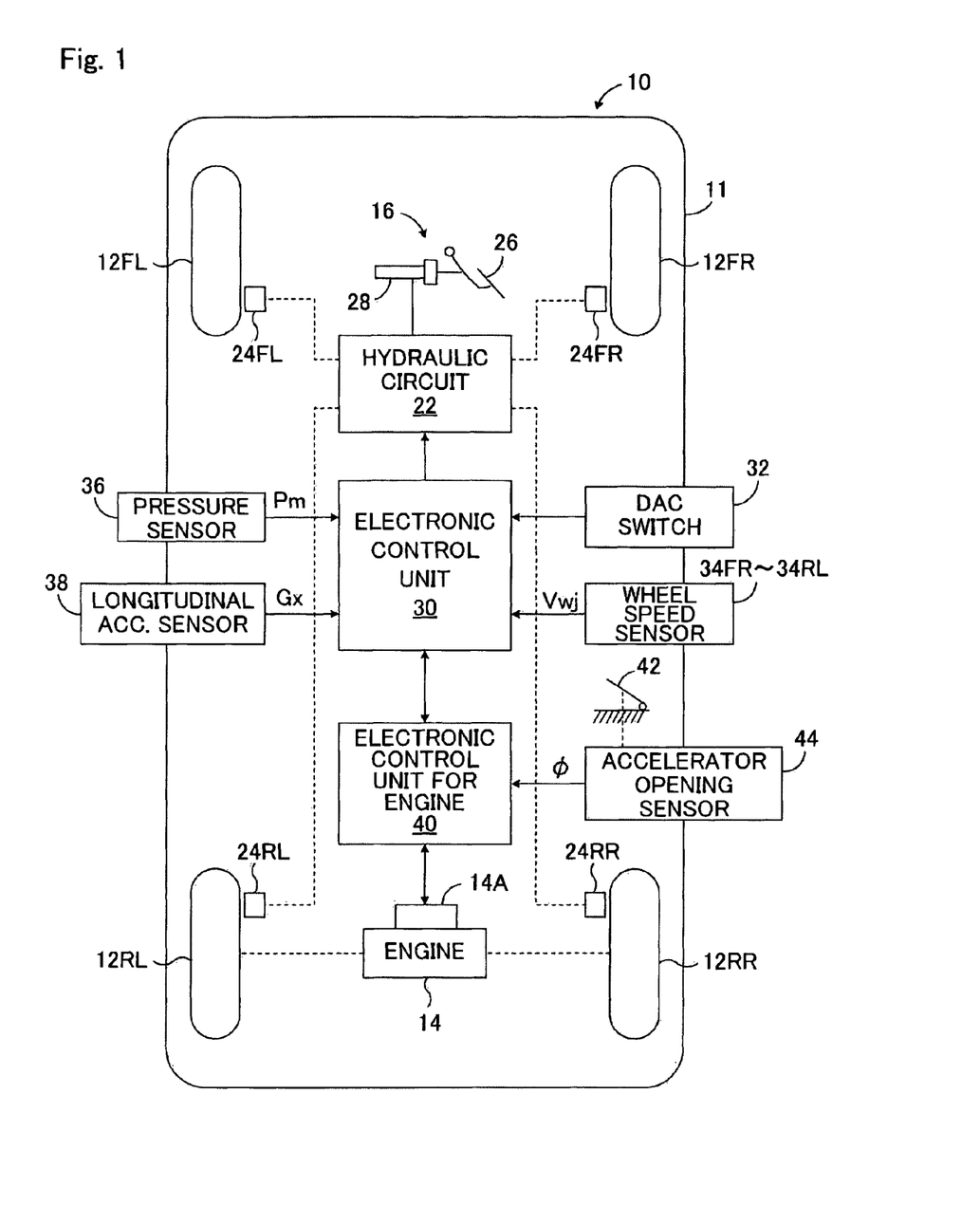
FIG. 1 is a schematic configurational view showing a first embodiment of a slope-descending speed control device for a vehicle according to the present invention which is applied to a rear-wheel-drive vehicle.

FIG. 1 is a schematic configurational view showing a first embodiment of a slope-descending speed control device for a vehicle according to the present invention which is applied to a rear-wheel-drive vehicle.

Referring to FIG. 1, 10 denotes a slope-descending speed control device which is installed in a vehicle 11. The vehicle 11 has a right front wheel 12FR, a left front wheel 12FL, a right rear wheel 12RR, and a left rear wheel 12RL. The vehicle 11 is equipped with an engine 14 which serves as a driving source and a braking device 16 which generates braking force. The engine 14 is provided with a throttle valve actuator 14A which actuates a throttle valve. The engine 14 supplies driving force to a right rear wheel 12RR and a left rear wheel 12RL by way of a driving force transmission system, not shown in the figure.

Although not shown in the figure, the right and left front wheels 12FR, 12FL, which are steerable wheels, are steered by a steering unit via tie rods, the steering unit being driven in response to steering operation of a steering wheel by a driver.

The braking device 16 includes a hydraulic circuit 22, wheel cylinders 24FR, 24FL, 24RR and 24RL provided for the right front, left front, right rear and left rear wheels, respectively, a brake pedal 26 and a master cylinder 28. Braking force of the wheels is controlled through control of the internal pressures Pj (j=fr, fl, rr and rl) of respective wheel cylinders 24FL, 24FR, 24RL and 24RR, i.e. brake pressures by the hydraulic circuit 22. It is to be noted that fl, fr, rl and rr denote the right front, left front, right rear and left rear wheels, respectively.

Although not shown in FIG. 1, the hydraulic circuit 22 includes a reservoir, an oil pump, various valve units, and the like. Brake pressure in each wheel cylinder is usually controlled by pressure in a master cylinder 28 driven by the driver's operation of depressing a brake pedal 26. Brake pressure in each wheel cylinder is also individually controlled as necessary by means of the hydraulic circuit 22 being controlled by a braking force control section of the electronic control unit 30. Thus, the braking device 16 is capable of individually controlling braking force of each wheel irrespective of braking operation of the driver.

The slope-descending speed control device 10 includes, in addition to the braking device 16 and the electronic control unit 30, a slope-descending speed control switch 32 (hereinafter referred to DAC switch as necessary) which is provided in a cabin of the vehicle and is electrically connected to the electronic control unit 30. The DAC switch 32 is changed over to on and off by the operation of an occupant of the vehicle and allows a slope-descending speed control to be executed by the electronic control unit 30 in accordance with flowcharts shown in FIGS. 2 and 3 when the switch is on.

The electronic control unit 30 is supplied with signals indicative of wheel speeds Vwj (j=fr, fl, rr and rl) from wheel speed sensors 34FR to 34RL provided for the respective wheels and a signal indicative of a master cylinder pressure Pm which is a pressure in the master cylinder 28 from a pressure sensor 36. The electronic control unit 30 is also supplied with a signal indicative of a longitudinal acceleration Gx of the vehicle from a longitudinal acceleration sensor 38 which detects a longitudinal acceleration Gx of the vehicle on the basis of a force acting on the vehicle 11 in its longitudinal direction.

The electronic control unit 30 gives and receives signals to and from an electronic control unit 40 which controls the output of the engine 14 by controlling the throttle valve actuator 14A. The depression amount of an accelerator pedal 42 which is depressed by the driver is detected by an accelerator opening sensor 44 as an accelerator opening $\phi$ and a signal indicative of an accelerator opening $\phi$ is inputted to the electronic control unit 40. The electronic control unit 40 usually controls the output of the engine 14 in accordance with the accelerator opening $\phi$.

When the output of the engine 14 is 0, the engine 14 acts as an engine brake by restraining the rotation of the right and left rear wheels 12RR and 12RL which are drive wheels and affords a deceleration to the vehicle 11. Consequently, the braking device 16 cooperates with the engine 14 to function as a deceleration-affording device which affords a deceleration to the vehicle.

Figure 2:
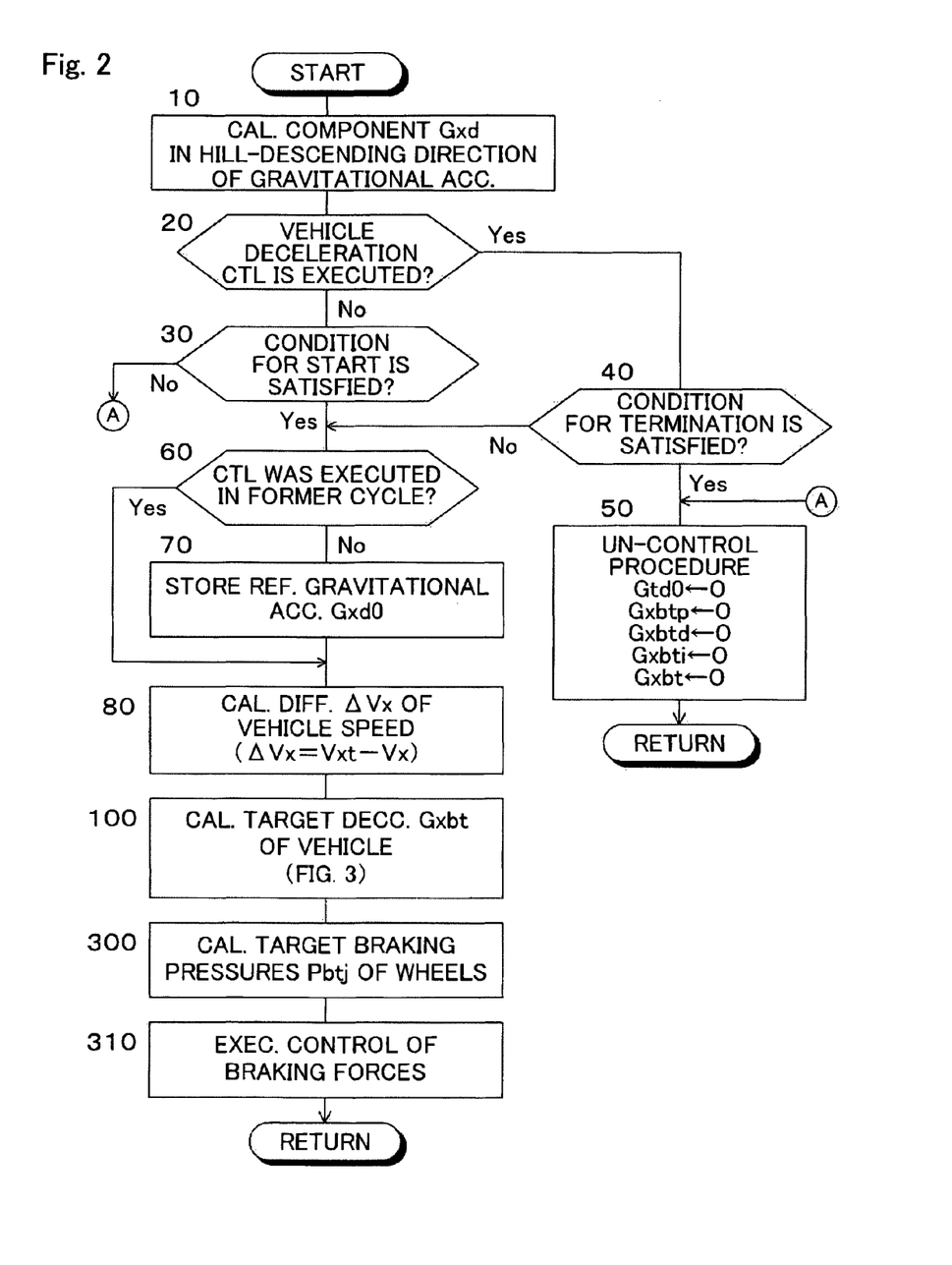
FIG. 2 is a flowchart showing a main routine of the slope-descending speed control according to the first embodiment.
Figure 3:
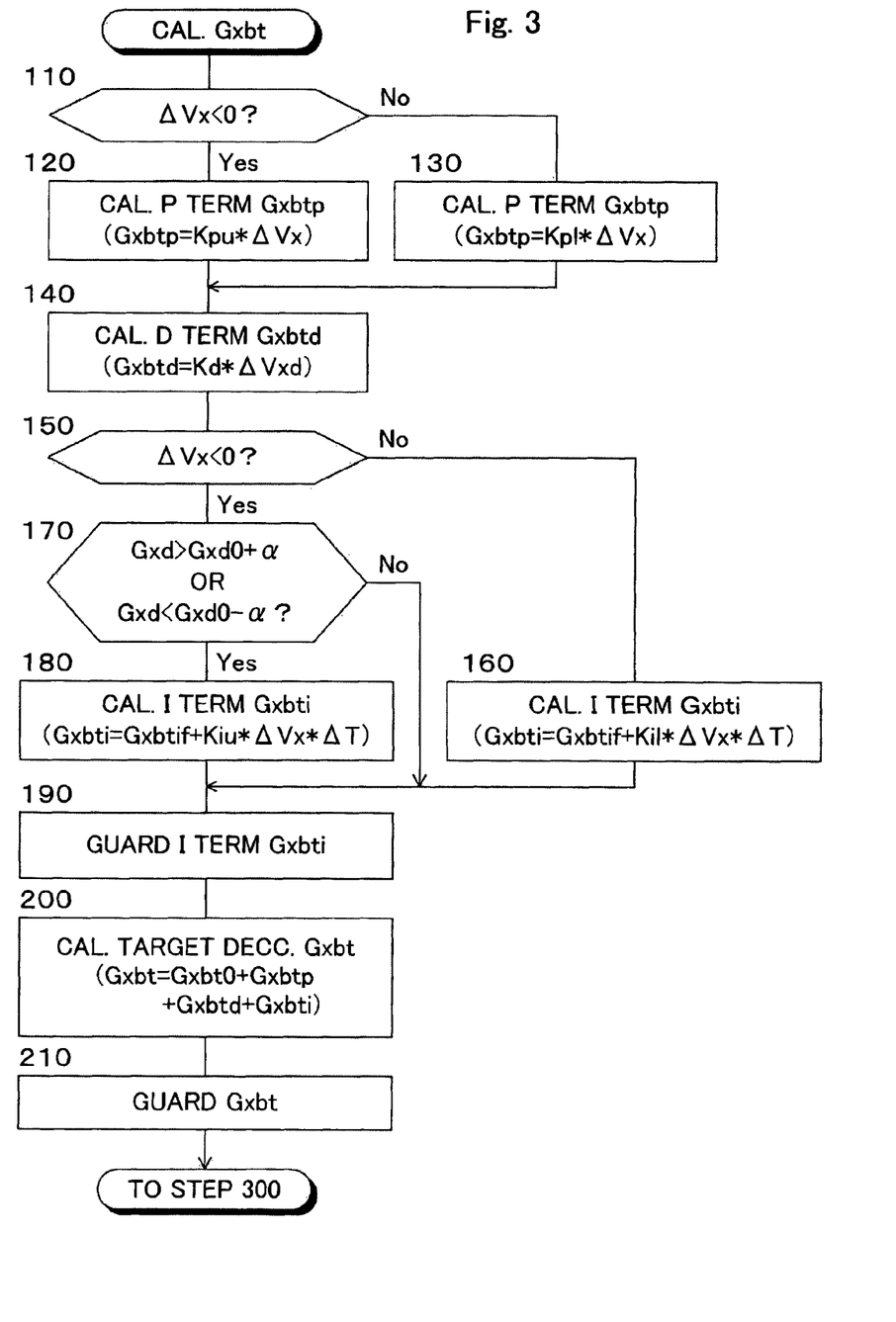
FIG. 3 is a flowchart showing a routine for calculating a target deceleration Gxbt of the vehicle which is conducted in step 100 in the flowchart shown in FIG. 2.

When the DAC switch 32 is on, a slope-descending speed control part of the electronic control unit 30 executes the slope-descending speed control according to the flowcharts shown in FIGS. 2 and 3. As described later, when a predetermined condition for starting the slope-descending speed control is satisfied, the slope-descending speed control part sets a component Gxd in a hill-descending direction of gravitational acceleration of a vehicle at the time point when the condition is satisfied to a reference gravitational acceleration Gxd0. The slope-descending speed control part calculates a target deceleration Gxdt of the vehicle on the basis of a target deceleration Gxb0 based on the reference gravitational acceleration Gxd0 and a target deceleration (a total of a proportional term Gxbtp, a differential term Gxbtd and an integral term Gxbti) of a PID feedback control executed in accordance with a difference $\Delta Vx$ between a target vehicle speed Vxt and an actual vehicle speed Vx.

The slope-descending speed control part calculates target braking pressures Ptj (j=fr, fl, rr and rl) of the wheels for controlling the deceleration of the vehicle to the target deceleration Gxdt on the basis of the target deceleration Gxbt. In addition, the slope-descending speed control part controls the braking device 16 so that braking pressures Pj (j=fr, fl, rr and rl) of the wheels conform to the respective target braking pressures, thereby to control the deceleration Gxb (=−Gx) of the vehicle so that an actual vehicle speed Vx conforms to a target vehicle speed Vxt.

In particular, the slope-descending speed control part calculates upper and lower reference values for preventing a target deceleration Gxdti of the integral term of the PID feedback control from being integrated on the basis of the reference gravitational acceleration Gxd0. When a component Gxd in a hill-descending direction of gravitational acceleration of the vehicle is not between the upper and lower reference values, the slope-descending speed control part integrates a target deceleration Gxdti of the integral term. In contrast, when a component Gxd in a hill-descending direction of gravitational acceleration of the vehicle is between the upper and lower reference values, the slope-descending speed control part does not integrate a target deceleration Gxdti of the integral term.

Further, the slope-descending speed control part calculates upper and lower guard values for limiting in magnitude a target deceleration Gxdti of the integral term of the PID feedback control on the basis of the reference gravitational acceleration Gxd0. The slope-descending speed control part conducts a guard process on a target deceleration Gxdti of the integral term with the upper and lower guard values and thereby modifies the target deceleration Gxdti of the integral term as necessary so that the target deceleration Gxdti do not escape from a range between the upper and lower guard values.

It is to be understood that the above-mentioned control parts of the electronic control unit 30 may each be actually constituted by a microcomputer including, for example, a CPU, a ROM, a RAM, and I/O devices. It is to be noted that the longitudinal acceleration sensor 38 detects a longitudinal acceleration Gx of the vehicle which assumes a positive value when it is in the forward direction, i.e., when a rearward force acts on the vehicle 11.

Next, the routine for achieving the slope-descending speed control in the first embodiment will be described with reference to the flowchart shown in FIGS. 2 and 3. The slope-descending speed control according to the flowchart shown in FIG. 2 is initiated upon a closing (ON) of an ignition switch (not shown) and is performed repeatedly at predetermined time intervals. It is to be noted that in the following descriptions, the slope-descending speed control according to the flowchart shown in FIGS. 2 and 3 is simply referred to "the control" as necessary.

First, prior to step 10, signals such as that indicating a longitudinal acceleration Gx of the vehicle 11 are read in, and in step 10, a component Gxd in a hill-descending direction of gravitational acceleration of the vehicle 11 is calculated. With a change rate (time differential value, for example) of a vehicle speed Vx which is calculated on the basis of wheel speeds Vwj being represented by Vxd, a component Gxd in a hill-descending direction may be calculated by conducting low-pass filtering on −Gx−Vxd.

In steps 20 to 40, a decision is made as to whether or not the vehicle deceleration control by means of the slope-descending speed control is to be executed. If a decision is made that the vehicle deceleration control is not to be executed, the control proceeds to step 50, whereas if a decision is made that the vehicle deceleration control is to be executed, the control proceeds to step 60.

In step 20, in particular, a decision is made as to whether or not the vehicle deceleration control by means of the slope-descending speed control is executed. If an affirmative decision is made, the control proceeds to step 40, whereas if a negative decision is made, the control proceeds to step 30.

In step 30, a decision is made as to whether or not a condition for starting the vehicle deceleration control by means of the slope-descending speed control is satisfied. If a negative decision is made, the control proceeds to step 50, whereas if an affirmative decision is made, the control proceeds to step 30.

Notably, a decision may be made that the condition for starting the vehicle deceleration control by means of the slope-descending speed control is satisfied when all the following decisions are made.
a1: The DAC switch 32 is on.
a2: The following a2-1 or a2-2 is satisfied.
a2-1: A vehicle speed Vx is not lower than a preset reference value Vx1.
a2-2: A vehicle speed Vx is not lower than a preset reference value Vx2 which is lower than the reference value Vx1, and a change rate Vxd of a vehicle speed Vx is not lower than a reference value Vxd3. Notably, Vx1, Vx2 and Vxd3 are preset values.

a3: The accelerator pedal 42 is not depressed.
a4: The brake pedal 26 is not depressed.

In step 40, a decision is made as to whether or not a condition for terminating the vehicle deceleration control by means of the slope-descending speed control is satisfied. If an affirmative decision is made, the control proceeds to step 50, whereas if a negative decision is made, the control proceeds to step 60.

Notably, a decision may be made that the condition for terminating the vehicle deceleration control by means of the slope-descending speed control is satisfied when any one of the following decisions is made.
b1: The DAC switch 32 is off.
b2: The accelerator pedal 42 was depressed.
b3: The brake pedal 26 was depressed.
b4: A condition has continued for a time of T1 or longer where a vehicle speed Vx is lower than a target vehicle speed Vxt during a slope-descending by a value which is not smaller than Vx4.
b5: A condition has continued for a time of T2 which is shorter than T1 or longer where a target deceleration Gbt of the vehicle is not smaller than 0. Notably, Vxt, Vx4, T1 and T2 are preset values.

In step 50, a un-control procedure, i.e. a procedure for preventing the vehicle deceleration control by means of the slope-descending speed control from being executed is conducted. Specifically, a reference gravitational acceleration Gxd0 described later, P term Gxbtp, D term Gxbtd and I term Gxbti of a target deceleration of PID feedback control described later based on a difference between a target vehicle speed Vxt and an actual vehicle speed Vx, and a target deceleration Gxbt of the vehicle are reset to 0.

In step 60, a decision is made as to whether or not the vehicle deceleration control by means of the slope-descending speed control was conducted in the former cycle, i.e. whether or not a decision was made that the vehicle deceleration control was to be conducted before the former cycle. If an affirmative decision is made, the control proceeds to step 80, whereas if a negative decision is made, the control proceeds to step 70. In the latter step, a component Gxd in a hill-descending direction of gravitational acceleration calculated in step 10 is set to the reference gravitational acceleration Gxd0 and is stored in the RAM.

In step 80, a difference ΔVx (=Vxt−Vx) between a target vehicle speed Vxt and an actual vehicle speed Vx is calculated. In the next step 100, as described later, a target deceleration Gxbt of the vehicle for the slope-descending speed control is calculated according to the flowchart shown in FIG. 3 on the basis of the reference gravitational acceleration Gxd0, the vehicle speed difference ΔVx and the like.

In step 300, target braking pressures Ptj (j=fr, fl, rr and rl) of the wheels for controlling the deceleration Gxb of the vehicle to the target deceleration Gxbt are calculated as described later for example, on the basis of the target deceleration Gxbt of the vehicle. First, a target braking force Fbvt of the whole of the vehicle is calculated as a product of the target deceleration Gxbt and a vehicle weight W. Notably, a vehicle weight W may be a preset value or may be estimated in any manner known in the art.

With a distribution rate for the front wheels of braking force being represented by Rf, a target braking force Fbwft of the right and left front wheels and a target braking force Fbwrt of the right and left rear wheels are calculated according to the following formulas (1) and (2). In addition, target braking pressures Ptj of the wheels are calculated on the basis of the target braking forces Fbwft and Fbwrt, a coefficient for converting a braking force to a braking pressure, a radius of the tires and the like.

$$Fbwft=Fbvt*Rf/2 \qquad (1)$$

$$Fbwrt=Fbvt*(1-Rf)/2 \qquad (2)$$

In step 310, the braking device 16 is controlled so that braking pressures Pj of the wheels conform to the respective target braking pressures Ptj, and the braking forces of the front and rear wheels conform to the target braking forces Fbwft and Fbwrt, respectively. Thus, the deceleration Gxb of the vehicle is controlled to be the target deceleration Gxbt.

Next, the routine for calculating a target deceleration Gxbt of the vehicle which is conducted in the above-mentioned step 100 will be described with reference to the flowchart shown in FIG. 3.

First, in step 110, a decision is made as to whether or not the difference ΔVx of vehicle speeds is a negative value, i.e. whether or not an actual vehicle speed Vx is higher than a target vehicle speed Vxt. If a negative decision is made, the control proceeds to step 130, whereas if an affirmative decision is made, the control proceeds to step 120.

In step 120, P term Gxbtp of a target deceleration of PID feedback control is calculated according to the following formula (3) in which Kpu is a proportional gain for increasing deceleration (a negative value).

$$Gxbtp=Kpu*\Delta Vx \qquad (3)$$

In similar, in step 130, P term Gxbtp of a target deceleration of PID feedback control is calculated according to the following formula (4) in which Kpl is a proportional gain for decreasing deceleration (a negative value).

$$Gxbtp=Kpl*\Delta Vx \qquad (4)$$

In step 140, D term Gxbtd of a target deceleration of PID feedback control is calculated according to the following formula (5) in which Kd is a differential gain (a positive value). It is to be noted that as in the above-mentioned step 10, Vxd in the following formula (5) is a change rate (time differential value, for example) of a vehicle speed Vx.

$$Gxbtd=Kd*Vxd \qquad (5)$$

In step 150, as in step 110, a decision is made as to whether or not the difference ΔVx of vehicle speeds is a negative value. If an affirmative decision is made, i.e. a decision is made that an actual vehicle speed Vx is higher than a target vehicle speed Vxt, the control proceeds to step 170, whereas if a negative decision is made, the control proceeds to step 160.

In step 160, I term Gxbti of a target deceleration of PID feedback control is calculated according to the following formula (6). It is to be noted that in the following formula (6), Gxbtif is a value of I term Gxbti in the former cycle; Kil is an integral gain for decreasing deceleration (a negative value); and ΔT is a cycle time of the flowchart shown in FIG. 2.

$$Gxbti=Gxbtif+Kil*\Delta Vx*\Delta T \qquad (6)$$

In step 170, with α being a positive constant, a decision is made as to whether or not the component Gxd in a hill-descending direction of gravitational acceleration of the vehicle 11 which was calculated in step 10 is larger than an upper reference value Gxd0+α or smaller than a lower reference value Gxd0−α. If a negative decision is made, the control proceeds to step 190, whereas if an affirmative decision is made, the control proceeds to step 180.

In step 180, I term Gxbti of a target deceleration of PID feedback control is calculated according to the following formula (7). It is to be noted that in the following formula (7), Gxbtif and ΔT are the same as in the above formula (6) and Kiu is an integral gain for increasing deceleration (a negative value).

$$Gxbti=Gxbtif+Kiu*\Delta Vx*\Delta T \qquad (7)$$

In step 190, an upper guard value is set to Gxbmax−Gxd0+β and a lower guard value is set to −Gxd0−β. In addition, I term Gxbti of the target deceleration is guarded so that I term Gxbti of the target deceleration does not become larger than the upper guard value and does not become smaller than the lower guard value.

It is to be noted that β is a positive constant which may be set considering detection error in the longitudinal acceleration sensor 38 and the like. Gxbmax is a maximum tolerable deceleration (a preset positive constant) for preventing the hydraulic circuit 22 and the wheel cylinders 24FR-24RL of the braking device 16 from being excessively loaded. Accordingly, the upper and lower guard values are the maximum and minimum values of I term Gxbti which are required in executing an effective deceleration control by means of the slope-descending speed control to control an actual vehicle speed Vx to the target vehicle speed Vxt.

In step 200, a target deceleration Gxbt of the vehicle is calculated according to the following formula (8). Notably, Gxbt0 in the following formula (8) is a target deceleration of the vehicle based on the reference gravitational acceleration Gxd0. In the present embodiment, Gxbt0 equals Gxd0.

$$Gxbt=Gxbt0+Gxbtp+Gxbtd+Gxbti \qquad (8)$$

In step 210, the upper and lower guard values are set to 0 and Gxbmax, respectively, and the target deceleration Gxbt of the vehicle is guarded so that it does not become negative and does not become larger than the maximum tolerable deceleration Gxbmax.

As is apparent from the above descriptions, when the vehicle deceleration control by means of the slope-descending speed control is to be executed, i.e., when an affirmative decision is made in step 60, steps 80 to 310 are conducted to execute the vehicle deceleration control by means of the slope-descending speed control. In step 100, a target deceleration Gxbt of the vehicle is set to a sum of the target deceleration Gxbt0 of the vehicle based on the reference gravitational acceleration Gxd0 and the target deceleration Gxbtp+Gxbtd+Gxbti of the PID feedback control.

It is to be noted that the target deceleration Gxbt0 of the vehicle based on the reference gravitational acceleration Gxd0 is set as a deceleration which opposes a component (acceleration) in a hill-descending direction of gravitational acceleration of the vehicle which acts when the control is started. Consequently, so long as an inclination angle, a frictional coefficient and the like of a road do not change, an actual vehicle speed Vx becomes a target vehicle speed Vxt and a target deceleration of the PID feedback control is substantially 0.

In contrast, in case that an inclination angle, a frictional coefficient of a road surface or the like changes after the control was started, an actual vehicle speed Vx does not become a target vehicle speed Vxt and a target deceleration of the PID feedback control increases or decreases in accordance with running condition of the vehicle. In particular, a target deceleration Gxdti of the integral term of the PID feedback control serves as a control quantity for conforming an actual vehicle speed Vx to a target vehicle speed Vxt to cope with the changes in an inclination angle, a frictional coefficient of a road surface and the like after the control was started.

The reference gravitational acceleration Gxd0 is a value set in step 70, i.e., a component in a hill-descending direction of gravitational acceleration of the vehicle which acts when the condition for starting the slope-descending speed control was satisfied. When a component Gxd in a hill-descending direction is not larger than the upper reference value Gxd0+α and is not smaller than the lower reference value Gxd0−α, a negative decision is made in step 170. That is, even though an inclination angle, a frictional coefficient of a road surface or the like changes after the control was started, when the change amount of an inclination angle, a frictional coefficient of a road surface or the like from that at the time of starting the control is small, I term Gxbti of a target deceleration of PID feedback control is not integrated.

Consequently, as compared to where I term Gxbti of a target deceleration is integrated regardless of the magnitude relationship of a component Gxd in a hill-descending direction of gravitational acceleration, in a situation where the change amount of an inclination angle, a frictional coefficient of a road surface or the like from that at the time of starting the control is small, the possibility can be reduced that the I term Gxbti becomes excessively large. Therefore, it is possible to prevent a situation from occurring where a vehicle speed excessively lowers and it takes a long time to restore a vehicle speed to a target vehicle speed due to the I term of a target deceleration becoming excessively large.

When a component Gxd in a hill-descending direction is larger than the upper reference value Gxd0+α or it is smaller than the lower reference value Gxd0−α, an affirmative decision is made in step 170. That is, when the change amount of an inclination angle, a frictional coefficient of a road surface or the like from that at the time of starting the control is large, I term Gxbti of a target deceleration of PID feedback control is integrated. Therefore, it is possible to allow I term Gxbti of the target deceleration to increase so that the deceleration of the vehicle increases to a required value, which enables to effectively control an actual vehicle speed Vx to a target vehicle speed Vxt.

The upper and lower reference values for preventing I term Gxbti from being integrated are set to Gxd0+α and Gxd0−α, respectively, on the basis of the reference gravitational acceleration Gxd0 which is a reference value for determining the magnitude of a component in a hill-descending direction of gravitational acceleration of the vehicle. Consequently, a range of a component in a hill-descending direction of gravitational acceleration in which I term of a target deceleration is not integrated can be set on the basis of the reference gravitational acceleration Gxd0, i.e., a component in a hill-descending direction of gravitational acceleration at the time of starting the control.

Figure 4:
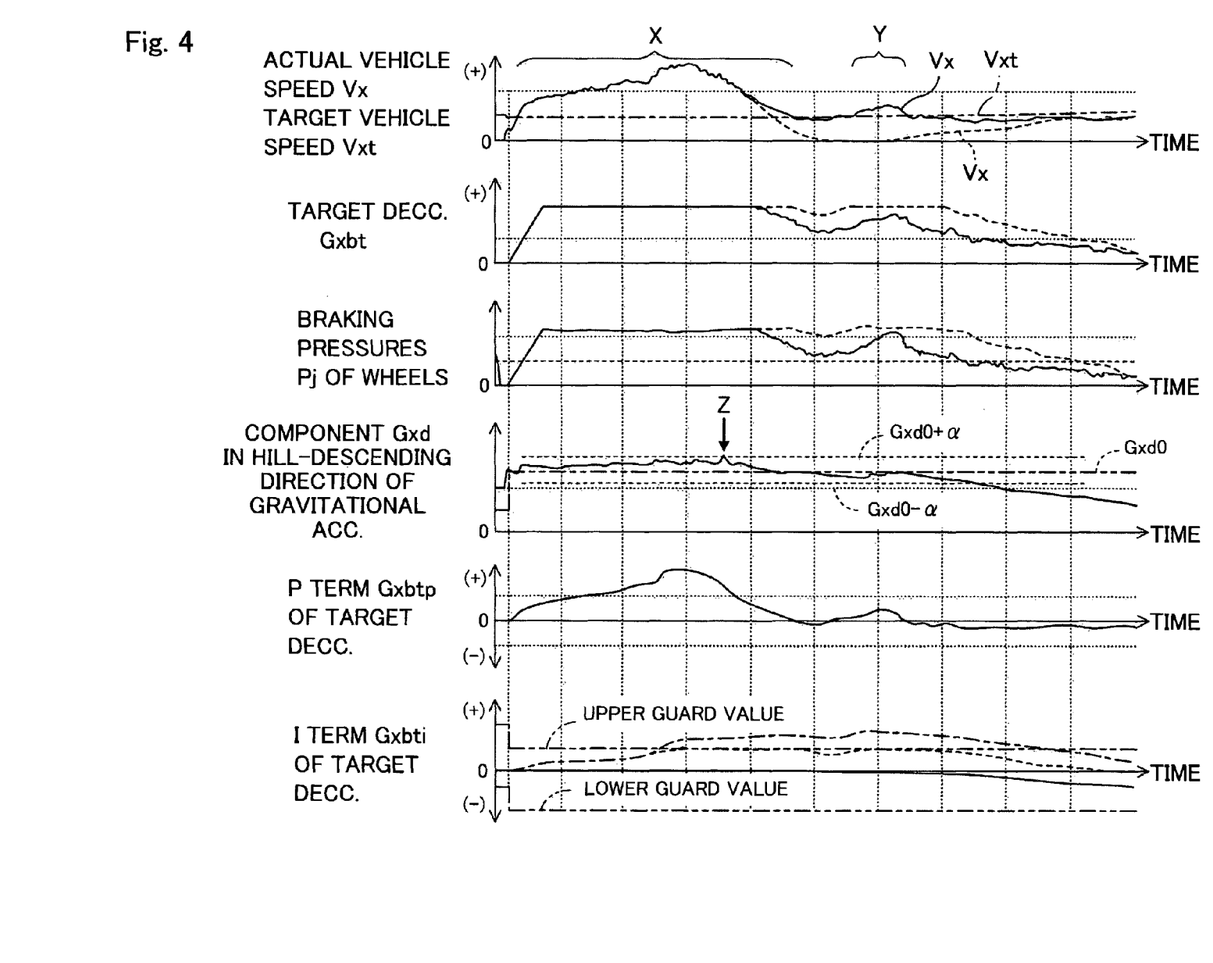
FIG. 4 is a graph showing an example of the operation of the first embodiment.

FIG. 4 is a graph illustrating the operation of the first embodiment. In FIG. 4, the solid line shows the first embodiment; the broken line shows a first comparative example in which steps 170 and 180 are not conducted; and the dashed line shows a second comparative example in which steps 170 to 190 are not conducted. In addition, in FIG. 4, X and Y shows areas where an actual vehicle speed Vx is higher than a target vehicle speed Vxt, i.e., areas where the difference ΔVx of vehicle speeds is a negative value and affirmative decisions are made in steps 110 and 150.

As shown in FIG. 4, in the first and second comparative examples, I term Gxbti of a target deceleration of PID feedback control becomes large and continues to be large after the time passed the area X. For that reason, a target deceleration Gxbt and braking pressures Pj continue to be high even after the time passed the area X, and a situation continues for a long time where an actual vehicle speed Vx is lower than a target vehicle speed Vxt, i.e., the vehicle is excessively decelerated.

Although, with respect to the second comparative example, a value of I term Gxbti of a target deceleration is shown in FIG. 4, the values of target deceleration Gxbt and the like are not shown. In the second comparative example, I term Gxbti of a target deceleration becomes higher than that in the first comparative example. Consequently, the above-mentioned tendency in the second comparative example is more evident than that in the first comparative example.

In contrast to these comparative examples, according to the first embodiment, a component Gxd in a hill-descending direction of gravitational acceleration of the vehicle exceeds the upper reference value Gxd0+α only in a very short period shown by an arrow Z. Accordingly, since in the other area than the very short area, I term Gxbti of a target deceleration is not integrated, I term Gxbti of a target deceleration does not become large. Therefore, a target deceleration Gxbt and braking pressures Pj does not continue to be higher after the time passed the area X, and an actual vehicle speed Vx becomes a value of or approximate to a target vehicle speed Vxt.

Second Embodiment

Figure 5:
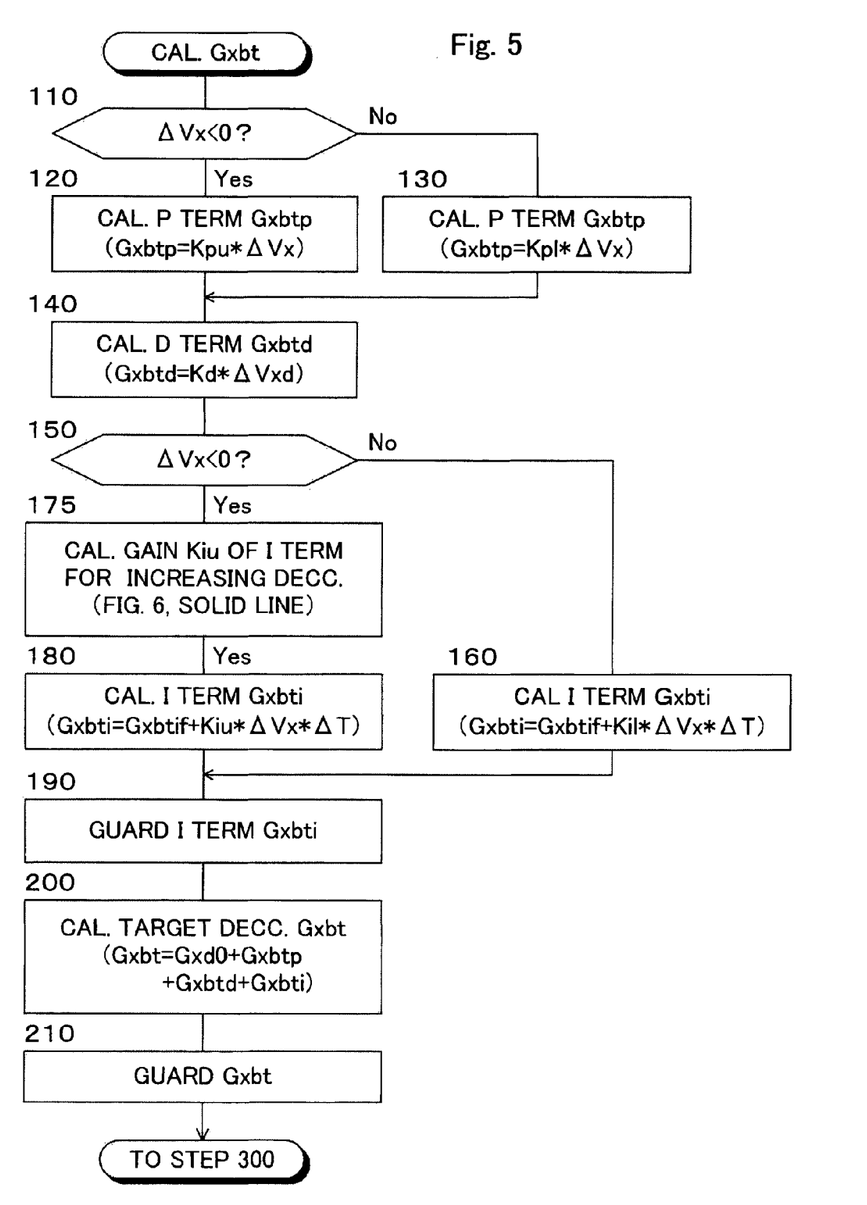
FIG. 5 is a flowchart showing a routine for calculating a target deceleration Gxbt of the vehicle in a second embodiment of the slope-descending speed control device for a vehicle according to the present invention.

FIG. 5 is a flowchart showing a routine for calculating a target deceleration Gxbt of the vehicle in a second embodiment of the slope-descending speed control device for a vehicle according to the present invention. In FIG. 5, the same steps as those shown in FIG. 3 are denoted by the same step numbers as in FIG. 3.

In the second embodiment, the main routine of the slope-descending speed control is carried out as in the first embodiment in accordance with the flowchart shown in FIG. 2. However, the calculation of a target deceleration Gxbt of the vehicle conducted in step 100 is not carried out in accordance with the flowchart shown in FIG. 3 but is carried out in accordance with the flowchart shown in FIG. 5.

As is understood from a comparison of FIGS. 5 and 3, steps 110 to 160 and steps 180 to 210 are conducted in the similar manners as in the associated steps in the above-described first embodiment. However, when an affirmative decision is made in step 150, i.e., a decision is made that an actual vehicle speed Vx is higher than a target vehicle speed Vxt, the control proceeds to step 175.

Figure 6:
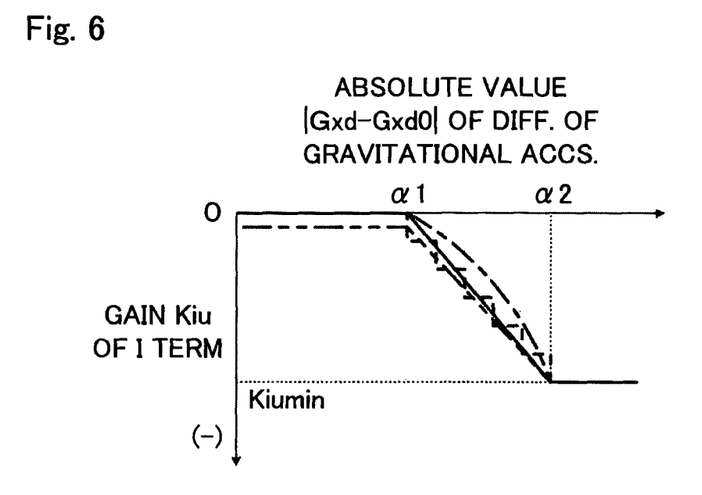
FIG. 6 is a graph showing a map for calculating a gain Ku of the integral term for increasing deceleration on the basis of a difference between a component Gxd in a hill-descending direction of gravitational acceleration of the vehicle and a reference gravitational acceleration Gxd0.

In step 175, an integral gain Kiu for increasing deceleration is calculated from a map shown in solid line in FIG. 6 on the basis of the absolute value of a difference between a component Gxd in a hill-descending direction of gravitational acceleration of the vehicle 11 and a determination reference value for determining the magnitude of the component in the hill-descending direction of gravitational acceleration of the vehicle. In the embodiment also, the determination reference value is a reference gravitational acceleration Gxd0. The α1 and α2 in FIG. 6 may be values which are smaller and larger, respectively than a in the first embodiment by Δα. The Δα may be a preset constant, but may variably be set by, for example, an occupant of the vehicle. The minimum value Kiumin may be a preset negative value.

Thus, according to the second embodiment, when the absolute value of the difference between a component Gxd in a hill-descending direction of gravitational acceleration and a reference gravitational acceleration Gxd0 is small, I term Gxbti of a target deceleration can be prevented from being integrated. Consequently, as in the first embodiment, in a situation where the change amount of an inclination angle, a frictional coefficient of a road surface or the like from that at the time of starting the control is small, the possibility can be reduced that the I term Gxbti becomes excessively large. Therefore, it is possible to prevent a situation from occurring where a vehicle speed excessively lowers and it takes a long time to restore a vehicle speed to a target vehicle speed due to the I term of a target deceleration becoming excessively large.

When the absolute value of the difference between a component Gxd in a hill-descending direction of gravitational acceleration and a reference gravitational acceleration Gxd0 is large, I term Gxbti of a target deceleration can be integrated. Therefore, it is possible to allow I term Gxbti of the target deceleration to increase so that the deceleration of the vehicle increases to a required value, which enables to effectively control an actual vehicle speed Vx to a target vehicle speed Vxt.

In particular, according to the second embodiment, as the absolute value of the difference between a component Gxd in a hill-descending direction of gravitational acceleration and a reference gravitational acceleration Gxd0 increases, an integral gain Kiu for I term can be increased to thereby increase the degree of allowing I term Gxbti of a target deceleration to increase. Consequently, the degree of allowing I term Gxbti of a target deceleration to increase can variably be set in accordance with the magnitude of the change amount of an inclination angle, a frictional coefficient of a road surface or the like from that at the time of starting the control. Therefore, as compared to the first embodiment, reduction in the possibility that I term Gxbti increases excessively and the allowance of increase in I term of a target deceleration can preferably be controlled.

The absolute value of the difference of gravitational acceleration which is a parameter for calculating an integral gain Kiu for I term is the absolute value of the difference between a component Gxd in a hill-descending direction of gravitational acceleration and a determination reference value for determining the magnitude of the component in the hill-descending direction of gravitational acceleration of the vehicle, and the determination reference value is a reference gravitational acceleration Gxd0. Therefore, an integral gain Kiu for I term can be set on the basis of a change value of the gravitational acceleration of the vehicle based on a reference gravitational acceleration Gxd0, i.e., a component in a hill-descending direction of the gravitational acceleration at the time of starting the control.

The map shown in solid line in FIG. 6 is set so that in the section between the points where the absolute value of the gravitational acceleration difference Gxd−Gxd0 are $\alpha 1$ and $\alpha 2$, an integral gain Kiu for I term linearly increases in magnitude as the absolute value of the difference Gxd−Gxd0 increases. However, as shown in broken line in FIG. 6, an integral gain Kiu for I term may increase stepwise in magnitude as the difference Gxd−Gxd0 increases. Alternatively, as shown in dash line in FIG. 6, an integral gain Kiu for I term may increase as high-order function or exponential function in magnitude as the absolute value of the difference Gxd−Gxd0 increases.

The map shown in solid line in FIG. 6 is set so that in the area where the absolute value of the gravitational acceleration difference Gxd−Gxd0 is smaller than $\alpha 1$, an integral gain Kiu for I term is 0. However, as shown in two-dot chain line in FIG. 6, even in the area where the absolute value of the gravitational acceleration difference Gxd−Gxd0 is smaller than $\alpha 1$, an integral gain Kiu for I term may be a value which is negative and is smaller in magnitude than the value in the area where the absolute value of the gravitational acceleration difference Gxd−Gxd0 is larger than $\alpha 1$. In that case, an integral gain Kiu for I term may be constant or may increase in magnitude as the absolute value of the difference Gxd−Gxd0 increases.

Notably, according to the first and second embodiments, in step 190, I term Gxbti of a target deceleration is guarded so that it does not become larger than the upper guard value and does not become smaller than the lower guard value. Therefore, as compared to where I term Gxbti of a target deceleration is not guarded, it is possible to effectively reduce the possibility that a vehicle speed excessively lowers and it takes a long time to restore a vehicle speed to a target vehicle speed due to the I term of a target deceleration becoming excessively large.

While the present invention has been described with reference to the above embodiments, it will be apparent to those skilled in the art that the present invention is not limited thereto, but may be embodied in various other forms without departing from the scope of the invention.

For example, in the above-described embodiments, a target deceleration Gxbt of the vehicle for the slope-descending speed control is calculated in step 100 as a sum of a target deceleration Gxbt0 of the vehicle based on the reference gravitational acceleration Gxd0 and target decelerations Gxbtp+Gxbtd+Gxbti of PID feedback control. However, P term Gxbtp or D term Gxbtd target decelerations of PID feedback control may be omitted. Alternatively, a target deceleration Gxbt may be calculated as a value which does not include a target deceleration Gxbt0 of the vehicle based on the reference gravitational acceleration Gxd0, i.e., as target decelerations Gxbtp+Gxbtd+Gxbti of PID feedback control.

In the above-described embodiments, a reference value for determining the magnitude of a component in a hill-descending direction of gravitational acceleration of a vehicle is a reference gravitational acceleration Gxd0, i.e., a component Gxd in a hill-descending direction of gravitational acceleration of a vehicle which acts when the condition for starting the slope-descending speed control is satisfied. However, a reference value for determination may be, for example, 0 or a value between 0 and a reference gravitational acceleration Gxd0.

While in the above-described embodiments, a target vehicle speed Vxt for the slope-descending speed control is preset, it may variably be set in accordance with the running condition of a vehicle. For example, a target vehicle speed Vxt may variably be set on the basis of a friction coefficient μ of a road surface so that it decreases as a friction coefficient μ decreases. In addition, a target vehicle speed Vxt may variably be set by a vehicle occupant.

While in the above-described embodiments, a component Gxd in a hill-descending direction of gravitational acceleration of a vehicle 11 is calculated by conducting low-pass filtering on a value which is derived by subtracting a a change rate Vxd of a vehicle speed Vx from a deceleration −Gx of the vehicle. However, an inclination angle θ of a road may be estimated and the component may be estimated as $g^* \sin \theta$ in which g represents gravitational acceleration of the vehicle. Alternatively, the component may be calculated as an average value of a value which is calculated in the manner as in the above-described embodiments and a value estimated by $g^* \sin \theta$.

While in the above-described embodiments, the deceleration of a vehicle assumes positive when it is in a direction opposite to the acceleration of the vehicle and accordingly, assumes positive when a forward speed of the vehicle decreases, it may be calculated as a negative value with acceleration assuming positive.

In the above-described embodiments, deceleration effect by the engine 14, i.e., an engine brake is not considered when target braking pressures Ptj of the wheels are calculated. However, the control may be modified so that target braking pressures Ptj of the wheels are calculated considering an engine brake. It may be achieved by calculating target braking forces Fbwft of the front wheels and target braking forces Fbwrt of the rear wheels on the basis of a value which is derived by subtracting an engine braking force from total braking force Fbvt of a vehicle.

While in the above-described embodiments, a vehicle is rear-wheel-drive car, the slope-descending speed control device according to the present invention may be applied to a front-wheel-drive car or a four-wheel-drive car.

The invention claimed is:

1. A slope-descending speed control device for a vehicle having a control unit which is configured to control a deceleration of a vehicle, when a predetermined condition for starting a slope-descending speed control is satisfied, so that an actual vehicle speed conforms to a target vehicle speed in accordance with at least a target deceleration of an integral term of a PID feedback control executed in accordance with a difference between a target vehicle speed and an actual vehicle speed, wherein said control unit calculates a component in a hill-descending direction of gravitational acceleration of the vehicle when an actual vehicle speed is higher than a target vehicle speed, with a reference value for determining a magnitude of a component in a hill-descending direction of gravitational acceleration of the vehicle being referred to a determination reference value, said control unit suppresses the increase of a target deceleration of said integral term in accordance with the magnitude of a difference between a component in a hill-descending direction of gravitational acceleration of the vehicle and said determination reference value.

2. The slope-descending speed control device for a vehicle according to claim 1, wherein said control unit calculates upper and lower reference values for preventing a target deceleration of said integral term from being integrated on the basis of said determination reference value, and when a component in a hill-descending direction of gravitational acceleration of the vehicle is between said upper and lower reference values, the control unit does not integrate a target deceleration of said integral term.

3. The slope-descending speed control device for a vehicle according to claim 1, wherein as a difference between a component in a hill-descending direction of gravitational acceleration of the vehicle and said determination reference value is smaller in magnitude, said control unit decreases the magnitude of a gain for integrating a target deceleration of said integral term.

4. The slope-descending speed control device for a vehicle according to claim 1, wherein with a component in a hill-descending direction of gravitational acceleration of the vehicle at a time point when said condition is satisfied being a reference gravitational acceleration, said control unit calculates a target deceleration of the vehicle on the basis of a target deceleration based on said reference gravitational acceleration and at least a target deceleration of said integral term, and controls a deceleration of the vehicle in accordance with said target deceleration of the vehicle.

5. The slope-descending speed control device for a vehicle according to claim 4, wherein said determination reference value is set on the basis of said reference gravitational acceleration.

6. The slope-descending speed control device for a vehicle according to claim 4, wherein said control unit calculates upper and lower guard values for limiting in magnitude a target deceleration of said integral term on the basis of said reference gravitational acceleration, and conducts a guard process on a target deceleration of said integral term with said upper and lower guard values.

* * * * *